US006308398B1

(12) United States Patent
Beavers

(10) Patent No.: US 6,308,398 B1
(45) Date of Patent: Oct. 30, 2001

(54) METHOD OF MANUFACTURING A WAFER FABRICATED ELECTROACOUSTIC TRANSDUCER

(75) Inventor: Bob Ray Beavers, Vista, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/459,223

(22) Filed: Dec. 10, 1999

Related U.S. Application Data

(62) Division of application No. 09/183,383, filed on Oct. 30, 1998, which is a division of application No. 08/711,444, filed on Sep. 6, 1996, now abandoned.

(51) Int. Cl.[7] .............................. H04R 31/00; H01G 7/00

(52) U.S. Cl. .............................. 29/594; 29/25.41; 29/412; 29/25.35; 29/886; 310/322; 310/324

(58) Field of Search .............................. 29/25.41, 25.35, 29/594, 595, 557, 886, 829, 412; 381/174, 191, 113, 116; 310/322, 324, 369

(56) References Cited

U.S. PATENT DOCUMENTS

| | | | |
|---|---|---|---|
| 3,405,559 | 10/1968 | Moffatt | 73/398 |
| 3,775,572 | 11/1973 | Ishibashi et al. | 179/111 |
| 3,775,839 | 12/1973 | Talmo et al. | 29/595 |
| 3,942,029 | 3/1976 | Kawakami et al. | 307/88 |
| 3,963,881 | 6/1976 | Fraim et al. | 179/111 |
| 3,991,285 | 11/1976 | Van Den Worm et al. | 179/111 |
| 4,225,755 | 9/1980 | Block | 179/111 |
| 4,249,043 | 2/1981 | Morgan et al. | 29/594 |
| 4,389,895 | 6/1983 | Rud, Jr. | 73/724 |
| 4,491,697 | 1/1985 | Tanaka et al. | 179/111 |
| 4,558,184 | 12/1985 | Busch-Vishniac et al. | 179/111 |
| 4,866,683 | 9/1989 | Phillips | 29/25.35 |
| 4,872,945 | 10/1989 | Myers et al. | 29/594 |
| 5,001,595 | 3/1991 | Dittrich et al. | 361/283 |
| 5,038,459 | 8/1991 | Yasuda et al. | 29/594 |
| 5,050,035 | 9/1991 | Hegner et al. | 361/283 |
| 5,101,543 | 4/1992 | Cote et al. | 29/594 |
| 5,272,758 | 12/1993 | Isogami et al. | 381/191 |
| 5,452,268 | 9/1995 | Bernstein | 367/181 |
| 5,623,102 | 4/1997 | Arndt et al. | 29/25.41 |

FOREIGN PATENT DOCUMENTS

| | | | |
|---|---|---|---|
| 2520838 | 11/1975 | (DE) | 29/594 |
| WO8204125 | 11/1982 | (EP) | 29/25.41 |
| 2122842 | 1/1984 | (EP) | 29/594 |
| 2218299 | 8/1990 | (JP) | 29/594 |

*Primary Examiner*—Lee Young
*Assistant Examiner*—A. Dexter Tugbang
(74) *Attorney, Agent, or Firm*—Terry J. Anderson; Karl J. Hoch, Jr.

(57) ABSTRACT

A method is disclosed for simultaneously producing a plurality of capacitive electroacoustic transducers. The method comprises forming a plurality of electrically insulative substrates by cutting circular slots to an insulating wafer. Each slot is interrupted by at least two tabs connecting a circular area with the remainder of the wafer. The conductive diaphragms are supported on diaphragm mounting rings disposed upon the substrate, spaced from a first electrode. The mounting rings space the diaphragm from the electrode to define a capacitor operative to convert electrical and acoustical signals.

2 Claims, 3 Drawing Sheets

METHOD OF MANUFACTURING A WAFER FABRICATED ELECTROACOUSTIC TRANSDUCER

This is a division of application Ser. No. 09/183,383, filed Oct. 30, 1998, which is a division of application Ser. No. 08/711,444, filed Sep. 6, 1996 now abandoned.

BACKGROUND OF THE INVENTION

1. Technical Field

This invention relates to electroacoustic transducers, such as microphones, and particularly to capacitive electroacoustic transducers fabricated in batches by means of a wafer manufacturing process.

2. Background Art

Capacitive electroacoustic transducers are widely used for the measurement of static and dynamic pressures. Traditionally, these capacitive transducers, such as employed in a microphone, have been made in such a manner that one electrode of a capacitor structure is formed by an electrically conductive diaphragm. This diaphragm is disposed adjacent to, but insulated from, a stationary electrode forming the other electrode of the capacitor structure. The two electrodes are spaced apart with an air gap in-between. A relatively high DC bias voltage is then applied between the electrodes. Variations in the electrode spacing caused by deflections of the diaphragm in response to the force of acoustic wave energy incident on the diaphragm, produce a change in capacitance. A detection network is connected to the capacitive transducer such that the change in capacitance is detected and transformed into an electrical signal proportional to the force of the acoustic wave energy applied to the diaphragm.

The sensitivity and performance of a capacitive electroacoustic transducer is closely tied to the at-rest spacing between the diaphragm and the stationary electrode. Thus, this spacing must be accurately controlled. To achieve accurate spacing, close machining tolerances are required for the parts making up the transducer. The required tolerances can be extremely difficult to hold in production. As a result, these devices are often hand crafted from machined parts in an attempt to meet the response and sensitivity characteristics imposed by the particular application in which the transducer is to be employed. This hand crafting tends to increase the cost of the transducers. Additionally, each transducer so produced exhibits a slightly different response in phase and magnitude.

The sensitivity and response of a capacitive electroacoustic transducer is also closely tied to its thermal stability. This thermal stability is partially dependent upon the change in the separation between the diaphragm and the stationary electrode caused by expansion or contraction of the transducer components when subjected to changing temperatures. The critical electrode spacing in existing capacitive transducers has been difficult to maintain over a widely varying temperature environment. This is especially true where the differential axial expansion length of the components is large in the first place. For instance, many existing transducers have expansion lengths on the order of 0.25 inch. Large expansion lengths mean that expansion and contraction of the transducer elements produce significant changes in the electrode separation distance. A significant change in this separation distance alters the response of the transducer. Additionally, changes in the tension on the diaphragm resulting from differing rates of expansion for the case than for the diaphragm, also affect the thermal stability of the transducer. When the tension of the diaphragm is allowed to change with temperature, the sensitivity of the transducer is altered.

Therefore, what is needed is a capacitive electroacoustic transducer which can be batch produced with consistent and reproducible response and sensitivity performance characteristics, and which maintains these characteristics even over a widely varying temperature environment.

SUMMARY

Wherefore, it is an object of the present invention to provide a capacitive electroacoustic transducer made by a repeatable process that produces a desired at-rest spacing between the diaphragm and planar electrodes of the transducer without the necessity of hand crafting.

Wherefore, it is another object of the present invention to provide a capacitive electroacoustic transducer which can be batch produced with repeatable and consistent response and sensitivity performance characteristics between the individual transducers so produced.

Wherefore, it is still another object of the present invention to provide a capacitive electroacoustic transducer which maintains consistent response and sensitivity performance characteristics over a widely varying temperature environment.

The foregoing objects have been attained by a capacitive electroacoustic transducer which includes an electrically insulative substrate, a layer of conductive material disposed on a portion of a top surface of the substrate forming a first electrode of the transducer, a conductive diaphragm forming a second electrode of the transducer which is deflectable in relation to the first electrode, and a structure for electrically and physically separating the first and second electrodes in a spaced relationship so as to constitute a capacitor. This electrical and physical separation allows an electric field formed between the first and second electrodes to vary in relationship with deflections of the second electrode to permit conversion between electrical and acoustic signals. In addition, the substrate and first electrode can include at least one through-hole for allowing air trapped in the space formed between the diaphragm and the top surfaces of the substrate and first electrode to escape to a region adjacent a back surface of the substrate. The number and diameter of these holes determines the resistance to the aforementioned air flow, and thus partially determines the response characteristics of the transducer. Also, the diaphragm includes a vent hole for equalizing relative pressure between ambient air exterior of the diaphragm and air interior of the diaphragm. This equalization is required to provide stable transducer performance characteristics in the face of variations in the external air pressure. In addition, the vent hole size can be varied to tune the response characteristics of the transducer.

Preferably, the separating structure is a diaphragm mounting ring disposed about the periphery of the top surface of the substrate and separated from the first electrode. The ring is thicker than the first electrode by an amount corresponding to a desired separation between the diaphragm and the first electrode. The diaphragm is also peripherally bonded to this diaphragm mounting ring. In addition, a compensation ring can be disposed on an opposite side of the substrate in an area corresponding to the diaphragm mounting ring on the top surface of the substrate. This compensation ring has the same physical size as the diaphragm mounting ring and is made of the same material. The purpose of the compensation ring is to balance out any stress caused in the substrate by the thermal expansion and contraction of the diaphragm mounting ring. Further, the diaphragm mounting ring and compensation ring can be electrically conductive and electrically connected, thereby allowing connection of the mounting ring to ground or to electronic components from the backside of the substrate.

A layer of conductive material is disposed on the sides of the through-holes and on a bottom surface of the substrate to provide an electrical pathway between the first electrode and the layer of conductive material on the bottom surface of the substrate. This pathway facilitates the connection of the first electrode to the electronics of the transducer.

The above-described transducer exhibits a high degree of thermal stability. The stability is partly due to the substrate and diaphragm being made of materials having closely matched thermal expansion coefficients. This feature ensures that the tension in the diaphragm stays constant even with varying temperatures, thereby maintaining a constant transducer sensitivity. Preferably, the substrate is made of FORSTERITE ceramic material and the diaphragm is made of titanium foil, which have closely matched thermal expansion coefficients. In addition, the distance separating the first and second electrodes is minimized so as to create a short thermal expansion path. This short path length minimizing changes in the response of the transducer due to variations in temperature. Preferably, the distance separating the first and second electrodes is approximately 0.001 inches. However, where it is preferred that the substrate and diaphragm be made of materials having dissimilar thermal expansion coefficients, another method of thermal compensation can be employed. A first layer of a thermally compensating material is interposed between the first electrode and the substrate, and a second layer of the thermally compensating material is disposed on an opposite side of the substrate in an area corresponding to the first layer on the top surface of the substrate. The thermally compensating material exhibits a thermal coefficient of expansion such that the substrate is induced to expand and contract at a rate substantially similar to that of the diaphragm. Thus, the sensitivity of the transducer remains constant under varying temperatures. In addition, a third layer of thermally compensating material can be interposed between the substrate and the diaphragm mounting ring, and a fourth layer of thermally compensating material can be disposed on the opposite side of the substrate in an area corresponding the location of the third layer on the top surface of the substrate. This additional application of thermally compensating material further enhances the aforementioned stabilizing effect.

The capacitive electroacoustic transducer according to the present invention is produced by a method including the steps of forming the electrically insulative substrate, forming the first electrode over a portion of a top surface of the substrate, forming the structure for electrically and physically separating the first electrode from the diaphragm, and attaching the diaphragm. The step of forming the electrically insulative substrate includes cutting a circular slot through a wafer made of an electrically insulating material. The circular slot is interrupted by at least two tabs connecting a circular area enclosed by the circular slot and constituting the substrate, with the reminder of the wafer. These tabs are breakable so as to release the substrate from the remainder of the wafer.

The step of forming the first electrode over a portion of a top surface of the substrate includes depositing a layer of metal in a central region thereof. Similarly, the step of forming the structure for electrically and physically separating the first electrode from the diaphragm includes depositing a layer of metal to form the diaphragm mounting ring. However, the center conductor and diaphragm mounting ring could alternately be formed by first depositing a layer of metal over the top surface of the substrate, and then, etching the metal to form the first electrode and diaphragm mounting ring.

The aforementioned step of attaching a conductive diaphragm preferably entails bonding the periphery of the diaphragm to the diaphragm mounting ring by thermal diffusion. However, conventional adhesives can be used if desired.

The method of producing a capacitive electroacoustic transducer can also include forming the aforementioned one or more holes in the substrate and first electrode for allowing air trapped in a space between the diaphragm and the top surfaces of the substrate and first electrode to escape to a region adjacent a back surface of the substrate. Additionally, the aforementioned layer of conductive material on the sides of the through-holes and on a bottom surface of the substrate can be formed by depositing metal on these surfaces. Further, the step of forming the layer of conductive material on the bottom surface of the substrate can include forming a first layer of material in a central region of the substrate and a second layer of material constituting a compensation ring. The compensation ring is disposed about the periphery of the bottom surface of the substrate and separated from the first layer. In addition, the first layer can have the same physical size as the first electrode and be made of the same material, and the compensation ring can have the same physical size as the diaphragm mounting ring and be made of the same material. The diaphragm mounting ring and the compensation ring can also be electrically connected. Finally, it is possible to form the aforementioned layers of thermally compensating material on the substrate when the substrate and diaphragm are made of materials having dissimilar thermal expansion coefficients.

The above described production method is not limited to manufacturing one transducer at a time. Rather the method is conducive to producing many transducers simultaneously. This is accomplished by forming a plurality of electrically insulative substrates by cutting a plurality of circular slots through a larger wafer. Each circular slot is interrupted by at least two tabs, as before. This facilitates the release the substrates from the remainder of the wafer by breaking the tabs. Additionally, a layer of conductive material is formed over a portion of a top surface of each substrate to form the first electrode of each transducer. Similarly, the structure for electrically and physically separating the first electrode from a second electrode is formed over a portion of the top surface of each substrate by depositing a layer of metal to form the diaphragm mounting ring. Next, the conductive diaphragm constituting the second electrode of the transducer is attached to each diaphragm mounting ring. This is accomplished by stretching a single sheet of a material comprising a material making up the diaphragm to a desired tension, and then, placing the stretched sheet of material onto the wafer such that portions of the sheet come into contact with each of the diaphragm mounting rings disposed on the wafer. The portions of the stretched sheet of material contacting each diaphragm mounting ring are then bonded to each ring, respectively. And finally, the excess portions of the stretched sheet existing outside an outer edge of each diaphragm mounting ring are cut away.

It can be seen that all the stated objectives of the invention have been accomplished by the above-described embodiments of the present invention. In addition, other objectives, advantages and benefits of the present invention will become apparent from the detailed description which follows hereinafter when taken in conjunction with the drawing figures which accompany it.

DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Preferred embodiments of the present invention will now be described with reference to the drawings.

Figure 1A:
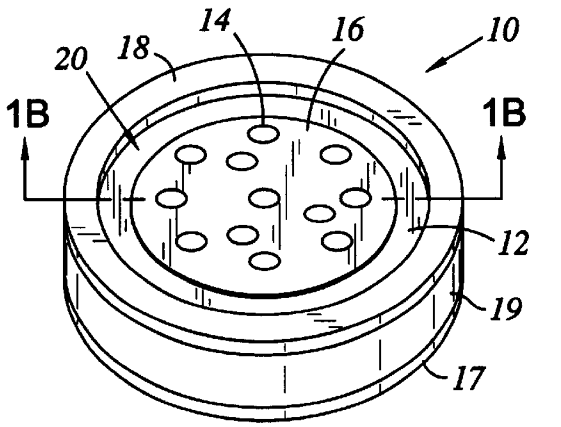
FIG. 1A is a perspective view of a capacitive electroacoustic transducer incorporating features of the present invention.
Figure 1B:
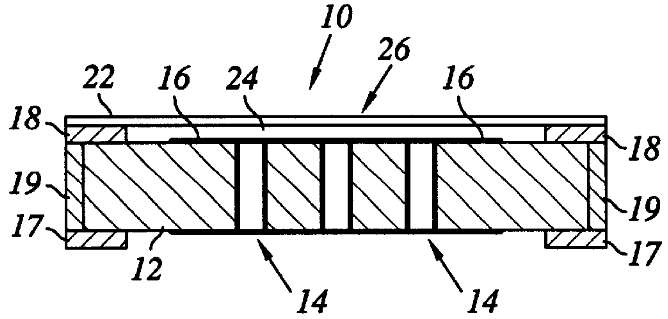
FIG. 1B is a cross-sectional view of the transducer of FIG. 1A.

FIGS. 1A–B shows a capacitive electroacoustic transducer 10 in accordance with a preferred embodiment of the present invention. The transducer 10 includes a cylindrical substrate 12 made of a insulative material. This insulative material is preferably FORSTERITE ceramic, and the substrate 12 preferably has a diameter of approximately 0.30 inches and a uniform thickness of about 0.025 inches. The center portion of the substrate 12 is covered with a thin conductive layer to form a center electrode 16 of the transducer 10. Preferably, this conductive layer is a thin layer of gold having a thickness in the range of about 1000 Å–0.5 mils. In addition, it is preferred that the center electrode 16 have a circular shape with a diameter of approximately 0.2 inches. The periphery of the substrate 12 is covered with an annular conductive layer which forms the diaphragm mounting ring 18. Preferably, this ring is also made of gold. The ring 18 is thicker than the conductive layer of the center electrode 16, and separated from it by a annular space 20, which is preferably about 0.2 inches wide. There is also a compensation ring 17 disposed on the side of the substrate 12 opposite the diaphragm mounting ring 18. This compensation ring 17 has the same physical dimensions and placement as the mounting ring 18, and is made of the same material (preferably gold). This ring 17 is used to equalize potential stresses placed on the substrate 12 by the mounting ring 18 due to its thermal expansion or contraction, assuming the substrate 12 and mounting ring 18 have difference coefficients of expansion. It is desirable to equalize the aforementioned stress because this could cause a bending of the substrate and result in a change in the performance characteristics of the transducer 10. However, by including the compensation ring 17 on the opposite side of the substrate 12, any induced stress is balanced out. In addition, the mounting ring 18 and compensation ring 17 can be electrically connected via a metalization layer 19 around the edge of the substrate. This metalization layer 19 allows the mounting ring 18 to be connected to ground, or to electronic components, from the backside of the transducer 10. The advantage of this backside connection scheme will be discussed more fully below in connection with a description of the packaging the transducer in a microphone.

A thin conductive diaphragm 22 stretches over the center electrode 16 and is attached at its edges to the ring 18, as best shown in FIG. 1B. This diaphragm 22 is preferably made of an approximately 0.0001 inch thick titanium foil. Titanium foil of this thickness will provide the necessary sensitivity to the acoustic input, while at the same time providing the mechanical strength required to ensure the diaphragm 22 is structurally sound.

The mounting ring 18 is thicker than the center electrode 16 to cause the diaphragm 22 to be spaced above the center electrode 16 by an air gap 24. This creates a capacitive structure with the center electrode 16 forming a stationary electrode, and the diaphragm 22 forming a movable electrode. The annular space 20 between the diaphragm mounting ring 18 and the center electrode 16 forms an electrical surface barrier between the elements to complete the capacitive structure. Preferably, the separation between the two electrodes 16, 22 is about 0.001 inches. Thus the mounting ring 18 is preferably about 0.001 inches thicker than the center electrode 16.

In addition, a small vent hole 26 is formed in the diaphragm 22 to equalize the pressure between the ambient air exterior of the diaphragm 22 and the air gap 24 behind the diaphragm 22. This prevents unwanted deflection of the diaphragm 22 due to changes in the ambient pressure. In addition, the diameter of the vent hole 26 determines the low frequency cut-off point in the transducer's response. It is preferred that this vent hole 26 be approximately 0.0015 inches in diameter. A conventional laser trimming process can be employed to produce a hole 26 of this diameter in the diaphragm 22.

There are also a series of uniformly spaced holes 14 formed through the substrate 12 and the overlying center electrode 16. The number of holes 14 and their respective diameters partially determine the response of the transducer 10. Assuming a hole diameter of about 0.025 inches, when a large number of holes 14 are formed (i.e. preferably 12), there is very little resistance to the movement of air from the space formed between the diaphragm 22 and the top surfaces of the substrate 12 and center electrode 16. This results in a transducer response having a substantially constant phase, but a large peak in the response at resonance. These characteristics are desirable in applications where a constant phase in required. The voltage spike can be smoothed using filtering electronics. If, however, fewer holes 14 are employed, the resistance to the movement of air increases. This higher flow resistance smoothes out the voltage spike in the transducer's response, but does not provide the aforementioned constancy in phase. The smoother response characteristics of this latter approach has advantage in some applications.

The above-described capacitive electroacoustic transducer 10 employing the preferred dimensions, and twelve through-holes 14, will exhibit a response in a range of about 5 Hz–10 kHz, and will have a sensitivity of about −40 $dB_v$. Of course, these performance characteristics can be modified to suit the application by employing different transducer dimensions.

Figure 2:
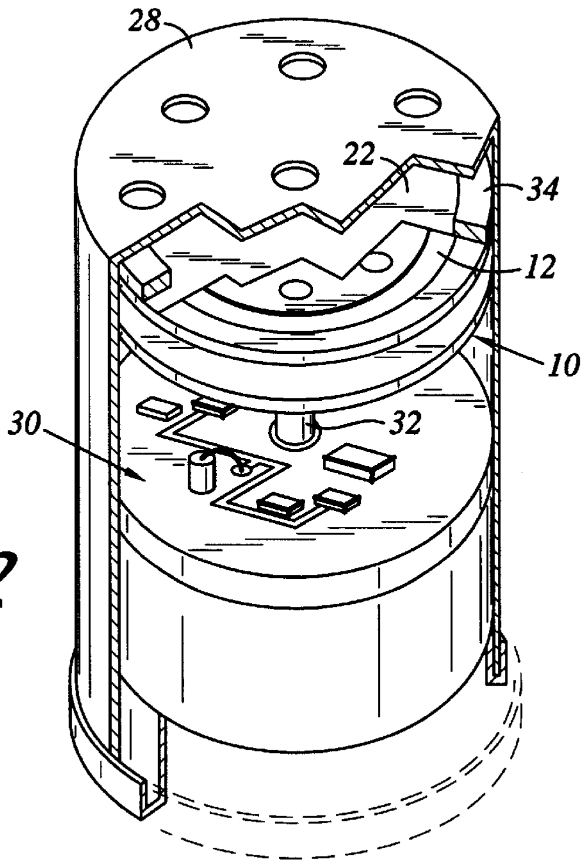
FIG. 2 is a partially cut-away view of a microphone incorporating the transducer of FIG. 1A.

The holes 14, and the surface of the substrate 12 opposite the center electrode 16 are also metalized to provide an electrical pathway between the center electrode 16 and the bottom of the substrate 12. This facilitates the packaging of the transducer 10 in a microphone as exemplified by FIG. 2. The transducer 10 is installed in a conductive casing 28 which also contains the electronic components, 30 necessary to detect and process changes in the capacitance of the transducer 10 caused by the force of the acoustic waves impacting the diaphragm 22. The center electrode is connected to the electronics 30 by means of a spring-mounted contact 32 touching the aforementioned metalization on the opposite side of the substrate 12. Whereas, the electrical pathway between the diaphragm 22 and the electronics 30 is provided via the conductive casing 28, or the compensation ring described previously. The diaphragm 22 is electrically connected to the casing 28 by a conductive spacer ring 34 disposed between the casing 28 and the periphery of the diaphragm 22. This spacer ring 34 additionally separates the vibrating portion of the diaphragm 22 from the top of the casing 28 to prevent interference between the two structures. The top of the casing 28 is perforated. The perforations allow the acoustic waves to pass through and impinge on the diaphragm 22. The bottom of the casing 28 is sealed to prevent sound waves from entering and impinging on the rear side of the diaphragm 22. Without such a provision the function of the device would be destroyed as the sound waves acting on the front and back of the diaphragm 22 would dampen or reduce its vibration.

Figure 3A:
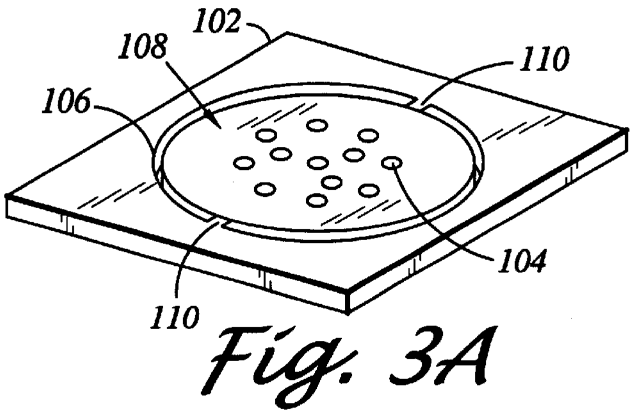
FIGS. 3A–D are perspective views of the transducer of FIG. 1A during various stages of fabrication in accordance with method features of the present invention.

FIGS. 3A–D illustrate the preferred sequence for fabricating a capacitive electroacoustic transducer in accordance with the present invention. The process begins with a wafer 102. The wafer 102 is laser machined to create the through-holes 104 and to form the circular outer edge 106 of the transducer's substrate 108 as shown in FIG. 3A. It can be seen that the substrate 108 is connected to the remainder of the wafer 102 by two thin spokes 110 so that it can be easily separated by breaking the spokes 110 after the transducer manufacturing processes are complete. Although two spokes 110 are preferred, more or less may be used if desired. Since the finished transducer can be mechanically broken free, there is no need for sawing the wafer 102. Sawing would require that the transducer have a generally square shape, instead of the more practical circular shape according to the present invention. In addition, the creation of potentially harmful dust from the sawing process is eliminated.

Figure 3B:
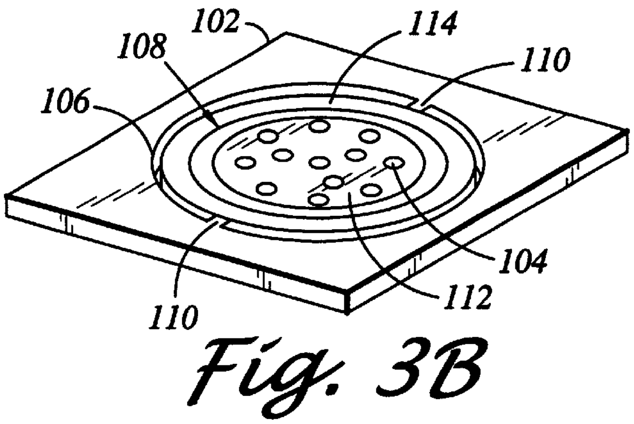
Figure 3C:
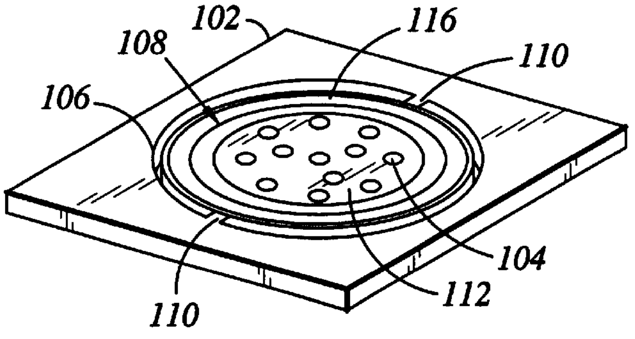

FIG. 3B illustrates the first metalization step of the process. In this step, a thin metal layer is deposited on the top of the substrate 108 to form the center electrode 112 and the base 114 of the diaphragm mounting ring. In addition, the metal is deposited on the sides of the through-holes 104 and on the bottom of the substrate 108 opposite the center electrode 112. The second metalization step is illustrated in FIG. 3C. In this step metal is deposited on top of the diaphragm mounting ring base to build-up the ring 116. The built-up ring 116 is then made completely uniform in height, for example, by lapping its top surface with a fixture employing a diamond stop.

Figure 3D:
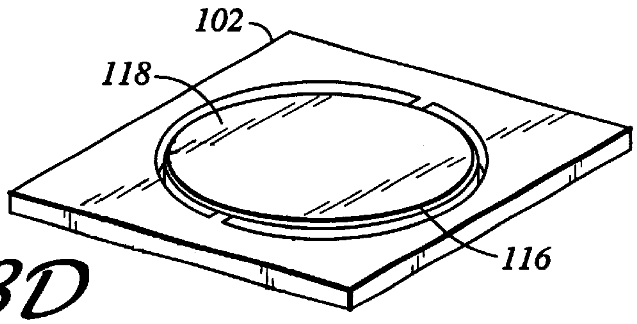

The diaphragm 118 is then stretched to the desired tension, preferably about 1000 N/m, and bonded to the top surface of the diaphragm mounting ring 116, as shown in FIG. 3D. Although, the diaphragm 118 could be bonded to the ring 116 using conventional adhesives, it is preferred that a thermal diffusion process be employed. Any excess diaphragm material extending past the perimeter of the ring 116 is removed after bonding to prevent peeling during subsequent processing.

Although a preferred thin film deposition process is described above, it is not intended that the invention be limited to this method. Rather, similar results can be obtained employing thick film processes, such as screening or electroplating. In addition, subtractive processes could be used. In these subtractive processes a thick layer of conductive material is selectively etched away to produce the transducer structure described previously. All of the processes mentioned are well known in the art and do not form novel aspects of the present invention. Accordingly, a detailed description of each method will not be provided herein.

Figure 4A:
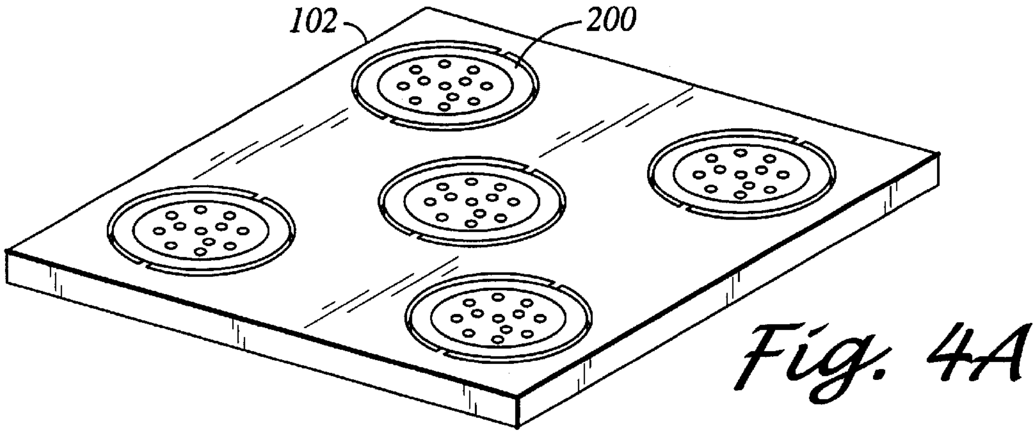
FIGS. 4A–B are perspective views of a plurality of the transducers of FIG. 1A being simultaneously batch produced during different stages of fabrication in accordance with method features of the present invention.
Figure 4B:
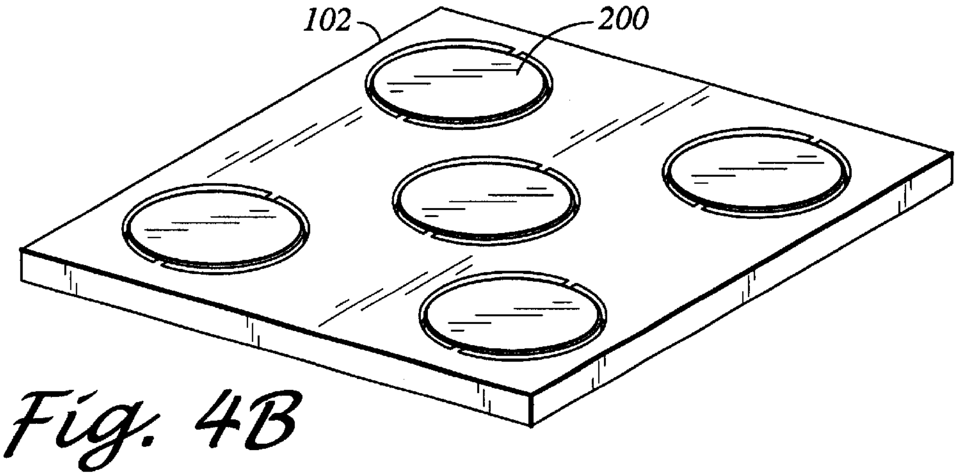

It will be appreciated by those skilled in the art that the above-described methods of manufacturing a capacitive electroacoustic transducer are amenable to batch processing. As shown in FIG. 4A, individual transducers 200, less diaphragms, are simply formed in a non-overlapping pattern on the wafer 202. A sheet of titanium foil large enough to cover the wafer 202 is then stretched to the desired tension, and placed over the wafer 202 so that it is in contact with each of the diaphragm mounting rings. The sheet of foil is then bonded to the rings, and the excess foil outside the edge of each ring is laser slit to allow individual transducer elements to be separated. The result is the finished transducers 200 shown in FIG. 4B. All that is left to do is break the tabs holding each transducer to the wafer.

In a tested embodiment of the present invention, twenty-three (23) transducers were simultaneously produced on a 2×2 inch square wafer. A 2×2 inch wafer was chosen for the tested embodiment so that a commercially available 3.5 inch wide sheet of titanium foil could be stretched over the wafer and bonded to the individual diaphragm mounting rings. However, larger wafers and titanium foil sheets could be employed, as available, to simultaneously produced many more transducers than in the aforementioned tested embodiment. It is envisioned that 100 or more transducers could be produced on a single appropriately sized wafer. This batch processing will result in considerable cost savings over the hand crafting methods typical of the prior art. In addition, because of the preciseness of current laser machining, and metal deposition/etching processes, each of the transducers produced on the wafer will have essentially identical structural dimensions. Accordingly, the resulting response and sensitivity performance characteristics of each transducer so produced will mirror those of every other transducer from the wafer. Additionally, the same characteristics can be maintained from one wafer to the next, thus making it possible to consistently produce transducers with repeatable and predetermined response and sensitivity performance characteristics. It is also noted that although the preferred materials and dimensional specifications were provided above, these can be easily modified to alter the performance characteristics of the transducer. Thus, production methods according to the present invention additionally make it possible to customize the performance characteristic of a transducer with little difficulty.

Capacitive electroacoustic transducers produced in accordance with the preferred embodiments of the present invention also exhibit excellent thermal stability. As discussed previously, thermal stability is partially dependent on the change in the separation between the diaphragm and the stationary electrode caused by expansion or contraction of the transducer components due to a change in temperature. The smaller the separation between the diaphragm and the electrode, the relatively less change that will occur due to the aforementioned expansion and contraction. In the case of the preferred embodiments of the present invention, this separation, or thermal expansion path length, is extremely short, i.e. only about 0.001 inches. Thus, very little change is experienced in the response of the transducer due to expansion and contraction, even in a widely varying temperature environment.

As also stated previously, changes in the tension on the diaphragm resulting from different rates of expansion of the diaphragm and the substrate, also affect the thermal stability of the transducer in that it alters the device's sensitivity. However, this source of instability has been substantially eliminated in the preferred embodiments of the present invention. Thermal expansion characteristics of the preferred FORSTERITE ceramic substrate and the titanium foil diaphragm have been closely matched so that they expand and contract at the same rate. Thus, a constant tension is maintained on the diaphragm. The coefficient of expansion for both materials is about $10.2\times10^{-6}$ per C°.

Figure 5:
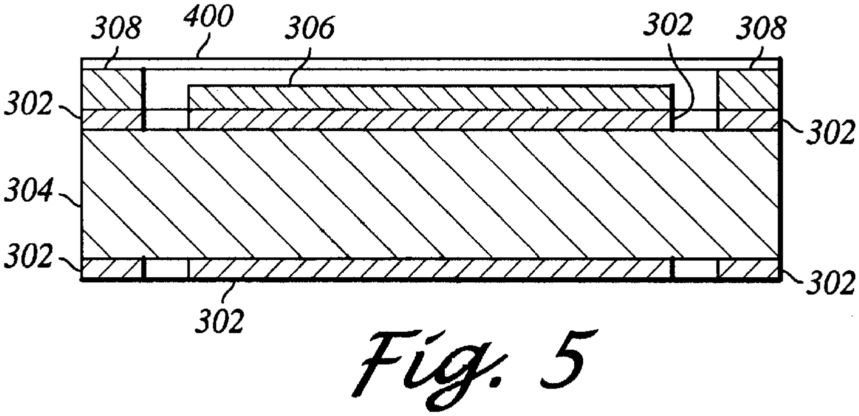
FIG. 5 is a cross-sectional view of an alternate embodiment of a transducer in accordance with the present invention wherein layers of a thermally compensating material are employed.

Although, the aforementioned matching of thermal expansion coefficients is the preferred method of maintaining a constant diaphragm tension, another method could be used instead. This alternate method entails depositing a layer of thermally compensating material on the substrate which modifies the element's rate of expansion. For instance, as shown in FIG. 5, if a substrate having a lower coefficient of expansion than the diaphragm is employed, a layer of thermally compensating material 302 exhibiting a high rate of expansion could be deposited on the substrate 304 under the center electrode 306, and possibly the diaphragm mounting ring 308, and on corresponding areas of the opposite side of the substrate 304. When subjected to a change in temperature, this added material causes the underlying substrate material to expand or contract at a faster rate. The material would be chosen so as to accelerate the rate of expansion or contraction to closely match that of the diaphragm. Thus, the tension on the diaphragm that would be maintained, and so the transducer's sensitivity. It is noted that the layer of thermally compensating material deposited on the bottom of the substrate is needed to equalize the resulting modified expansion and contraction of the substrate. If the material were placed only on the top, the expansion and contraction of the upper part of the substrate would differ from that of the lower part. This would cause the substrate to distort and affect the uniformity of the spacing between the center electrode and the diaphragm.

While the invention has been described in detail by reference to the preferred embodiments described above, it is understood that variations and modifications thereof may be made without departing from the true spirit and scope of the invention. For example, while the capacitive electroacoustic transducer was described herein in connection with the conversion of an acoustic signal impinging on the diaphragm into a proportional electrical signal, as in a microphone, the reverse could also be true. A varying electrical signal could be superimposed on a fixed DC bias on the transducer's electrodes (i.e. the center electrode and the diaphragm). This would cause a vibration of the diaphragm due to the variation of the electric field between the electrodes. An acoustic output signal would thus be produced, and the transducer would act as a speaker.

Wherefore, what is claimed is:

1. A method of simultaneously producing a plurality of capacitive electroacoustic transducers comprising the steps of:

(a) forming a plurality of electrically insulative substrates by cutting a plurality of circular slots through a wafer comprising an electrically insulating material, each circular slot being interrupted by at least two tabs connecting a circular area enclosed by the circular slot and constituting the substrate, with a remainder of the wafer, wherein the tabs are breakable so as to release the substrate from the remainder of the wafer;

(c) forming a plurality of conductive diaphragms constituting respective second electrodes of each transducer, each diaphragm being deflectable in relation to a respective first electrode;

(d) forming a plurality of diaphragm mounting rings of electrically conductive material, each diaphragm mounting ring disposed about the periphery of the top surface of the substrate and separated from the first electrode, each diaphragm mounting ring being thicker than the first electrode by an amount corresponding to a desired separation between the diaphragm and the first electrode; and (e) attaching the diaphragms to the respective diaphragm mounting rings to separate the first and second electrodes in electrical and physical spaced relationship so as to constitute a capacitor thereat, such that an electric field formed between the first and second electrodes varies in relationship with deflections of the second electrode to permit conversion between electrical and acoustic signals.

2. The method of claim 1, wherein the steps of forming a plurality of conductive diaphragms and attaching the diaphragms to the respective diaphragm mounting rings comprise the steps of:

(a) stretching a single sheet of a material comprising a material making up the diaphragm to a desired tension;

(b) placing the stretched sheet of material onto the wafer such that portion of the sheet comes into contact with each of the diaphragm mounting rings disposed on the wafer;

(c) bonding the portion of the stretched sheet of material contacting each diaphragm mounting ring to each said ring, respectively; and (d) cutting away excess portions of the stretched sheet existing outside an outer edge of each diaphragm mounting ring.

* * * * *